Nov. 25, 1941.     O. FOX     2,263,767
IGNITION SYSTEM AND PILOT CONTROL THEREFOR
Filed Nov. 24, 1936     2 Sheets-Sheet 1
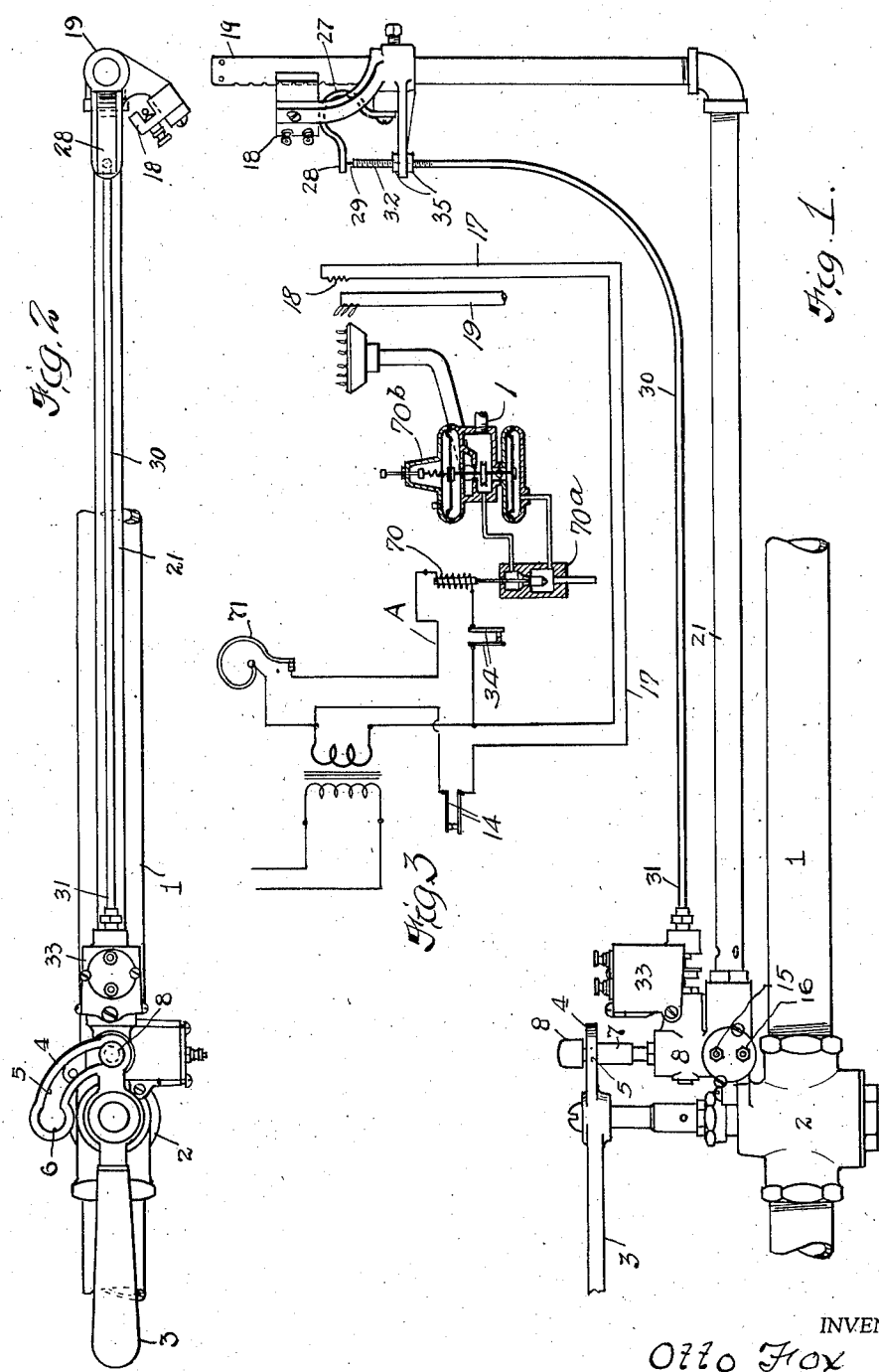
INVENTOR.
Otto Fox
BY Fay, Oberlin & Fay
ATTORNEYS.

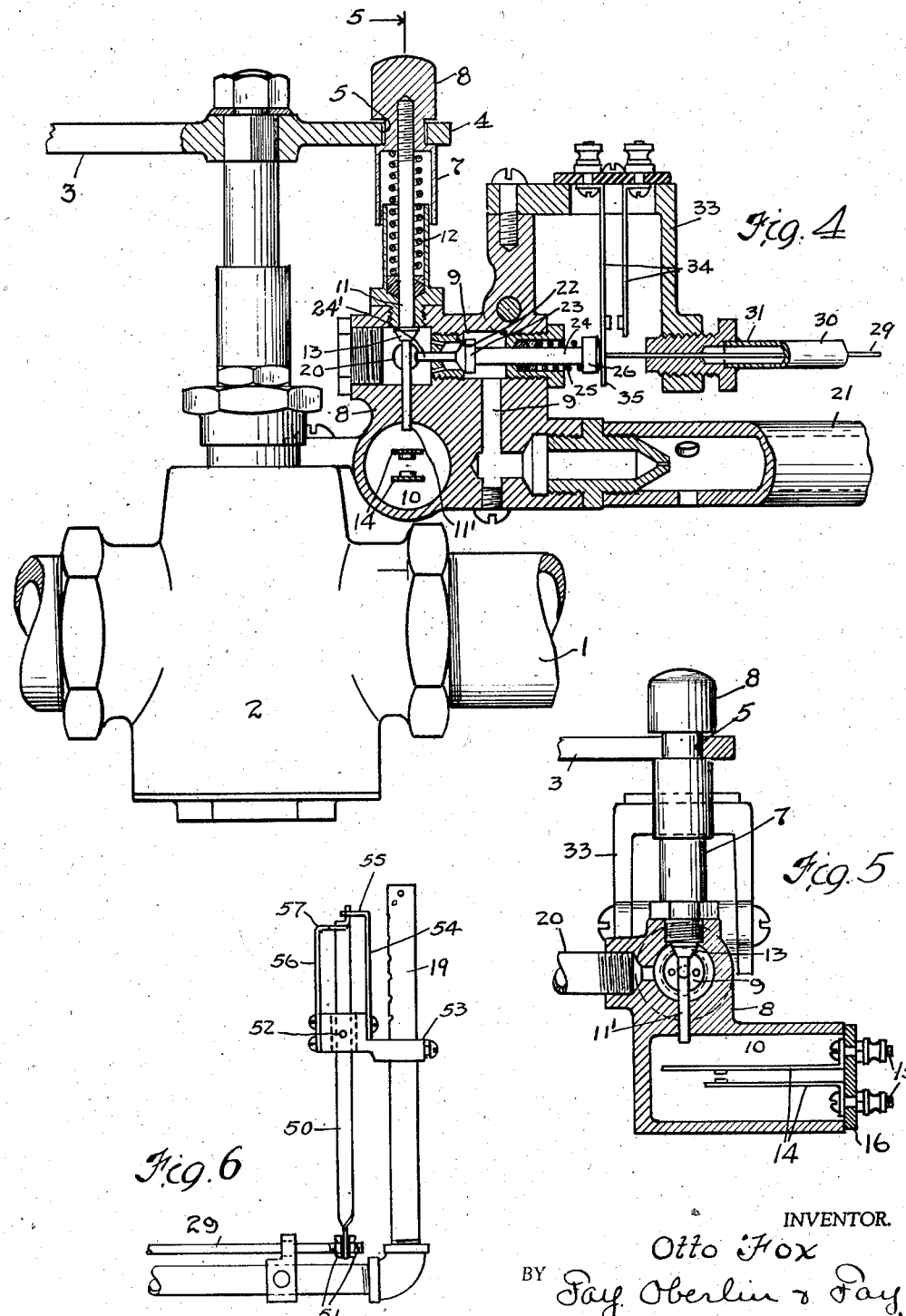

Patented Nov. 25, 1941

2,263,767

UNITED STATES PATENT OFFICE 2,263,767

IGNITION SYSTEM AND PILOT CONTROL THEREFOR

Otto Fox, Cleveland, Ohio

Application November 24, 1936, Serial No. 112,617

14 Claims. (Cl. 158—117.1)

My invention relates to control of heating furnaces and the like wherein gas is used as a fuel. Particularly it relates to mechanism adapted to so co-operate in a system as to prevent explosions and other dangers inherent in fuel gas when it escapes unburnt from the burners of such a heating apparatus. Such dangers arise from turning the gas on and allowing it to flow from the burner a few seconds before igniting it, or from extinguishing the burning gases without closing the valve in the supply line.

An object of my invention is the provision of a device usable in a system of control for a gas-fired furnace, or the like, which will insure against escape of unburnt gas from the burners thereof.

It is a further object to provide means in which the device for lighting the pilot flame is locked in inoperative position when the main valve in the line to the furnace is open, and in which the said device for lighting the pilot flame will control a switch which may be connected in a circuit controlling the valve in a pressure regulator and cause it to close unless the pilot flame is burning.

It is a further object to provide a device for lighting the pilot flame which will be controlled by a single element operable only when the main valve in the gas supply line is closed, and which will be automatic after the initial movement of said element.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevational view of such a mechanism embodying my invention for lighting a pilot burner including means for locking same and means operable by said first-named means capable of controlling the operation of a valve in a pressure regulator supplying gas to a burner.

Fig. 2 is a top view of same.

Fig. 3 is a diagrammatic view showing the electric circuits of a system of furnace control and the relation therein which may be given switches included in my ignition control device.

Fig. 4 is a cross-sectional view of part of the device shown in Fig. 1.

Fig. 5 is a cross-sectional view taken on the line 5—5 in Fig. 4.

Fig. 6 is an elevational view of an optional bimetal element for control of my device through the heating effect of a pilot flame.

A complete system for the control of fuel supply to a gas furnace, or the like, includes an electric circuit in which there are connected in series a thermostat switch at a remote place of control, a solenoid or other device operative to open and close a regulator valve in the gas supply line to the furnace such as is disclosed in my co-pending application No. 101,497, filed September 18, 1936, and a switch held open by the pressure of a bimetal element until said element is subjected to the heat of the lighting pilot in the furnace; a second electric circuit in which an electric ignition unit and a switch are in series; and mechanism operative to lock said last-named switch closed and simultaneously open a valve in the gas supply line to the lighting pilot, said mechanism being inoperative when said bimetal element is heated by the flame of said pilot burner; said valve being opened by resilient means when released from other forces, which resilient means closes the said switch in said first circuit. A preferred embodiment of my invention as it pertains to said mechanism for so correlating said switch controlled by a bimetal element and said switch in series with said ignition unit is shown in Figs. 1, 2 and 4.

In said drawings, a main gas supply line 1 leads to a burner not shown. A valve 2 controls the flow of gas in said line, which valve is operated manually by the handle 3. Mounted integrally with said handle 3 is a locking element 4 provided with an arcuate slot 5, one end of which terminates in an enlarged circular aperture 6. Mounted through the slot 5 is a starter plunger 7 which carries an enlarged head 8 such as will pass through the aperture 6 but will not pass through the slot 5. The relation of the valve 2, its handle 3, the locking element 4 and the starting plunger 7 is such that the aperture 6 is in position to permit the depression of the starter plunger head 8 therethrough only when the valve is closed.

Mounted on the housing of the valve 2 is a casing 8 which has an angular gas passage 9 therethrough and a compartment 10. The said starting plunger 7 carries a stem 11 which passes through the passage 9 normal thereto and terminates inside the compartment 10. A spiral spring 12 mounted on said stem 11 urges the starting plunger 7 upward. A collar 13 with an inclined face is mounted on said stem 11 within the passage 9 for a purpose hereinafter explained. Mounted in the compartment 10 are two tongues of a contact switch 14 which are attached to binding posts 15 mounted through an insulating cap 16 closing an open side of said compartment 10. The relation of said starter plunger stem 11 to said switch tongues 14 is such that when the starter plunger 7 is forced down against the resiliency of the spring 12 the tongues will be forced into electrical contact by the extension 11'. Preferably the cap 16 and the binding posts 15 will be mounted with leak-proof joints that there may be no slight leakage of gas. By means of the binding post 15, the switch tongues 14 may be connected serially in a circuit 17, such as is diagrammatically shown in Fig. 3, but not otherwise shown, which circuit may also include a source of suitable E. M. F., and a heating element 18 located by a pilot light 19 as is hereinafter explained.

A tubing 20 connected with a source of gas supply is mounted through the wall of the gas passage 9 and a second tubing 21 is mounted in the wall of casing 8 at the opposite end of said passage 9. Said second tubing terminates in a pilot burner 19 constructed as is well understood in the art. Mounted in the passage 9 is a valve seat 22 and a valve 23, the latter being mounted on a valve stem 24, one end of which extends through the wall of the casing 8 and has a head 26 against which a spiral spring mounted on said stem 24 resiliently acts to move said valve 23 away from said valve seat 22. The other end 24' of the valve stem 24 extends through the valve seat 22 and terminates in a position, such that when the valve 23 is seated, the said end 24' will be engaged by the collar 13 on the stem 11 of the starter plunger 7 as the latter is moved downward and the stem 24 will be forced outwardly opening the valve 23 against the pressure of a safety device as will be hereinafter explained. The relation of the inside end of the valve stem 24 with the said collar 13 on the stem 11 of the starter plunger 7 is such that the stem 24 after being forced outward will pass the collar 13 and hold the starter plunger locked in depressed position until released as will be explained.

Mounted on the pilot light 19 is a bimetal element 27 curved in the conventional manner and so mounted that the heat of the pilot when lighted will act thereupon and expand it causing the free end 28 to move toward a straight position. Between the said free end 28 and the head 26 of the valve stem 24 extends a stiff wire 29 mounted through a small tubing 30, which tubing is mounted on one end 31 adjacent the valve stem head 26 and extends to a point adjacent the said bimetal element 27. The said wire 29 and tubing 30 are so positioned and adjusted by nuts 35 that when the bimetallic element 27 is cold, the wire 29 will press against the head 26 of the valve stem 24 with force sufficient to close the valve 22 against the pressure of the spring 25.

Mounted on the casing 8 is a switch box 33 through one wall of which a contact switch of two blades 34 is mounted and so positioned that the extended end 35 of one blade is located between the head 26 of the valve stem 24 and the end of the wire 29 which bears against said head. It will be noted that the said switch box 33 affords a convenient mounting for the end 31 of the tubing 30.

The relation of the said contact switch of two blades 34 to the said valve stem 24 and the wire 29 is such that when the bimetallic element 27 is cold the wire 29 is urged toward the valve stem 24 with force sufficient to hold the valve 23 closed against the pressure of spring 25 which tends to hold said valve open. When the bimetal element 27 is heated it moves away from the wire 29, and the spring 25 moves the valve 23 to an open position. When the valve 23 is held closed, the contact switch of two blades 34 is held open and when the said valve is thus opened, the said switch is closed. It will be noted that downward movement of the starter plunger 11 will move the valve 23 to a locked open position against the pressure of the wire 29, but this movement of the valve 23 and its stem 24 may be so restricted that the said blades of the switch 34 will not contact until pressure of the wire 29 is released by heating the bi-metal element 27.

In Fig. 6 is disclosed an improved form of bimetal control which may preferably be substituted for the conventional goose-neck element 27. In said improvement the wire 29, or a light rod substituted therefor is reciprocated by a lever 50 to the lower end of which it is adjustably attached by the nuts 51 on a screw thread on the end of said wire or rod. Said lever is fulcrumed on a pivot 52 in a bracket 53 mounted on the pilot 19. The upper end of lever 50 extends parallel with and adjacent the pilot 19. Mounted on the bracket 53 and extending upward between the lever 50 and the pilot 19 is a bimetallic element 54 so disposed that when heated by the flame of the pilot, the free upper end will move away from said pilot. A projection 55 normal to the element 54 has an aperture through which the upper end of the lever 50 projects. Mounted on the bracket 53 is a second upwardly extending bimetallic element 56 on the opposite side of said lever 50. This second element 56 has a similar normal projection 57 extending toward the upper end of the lever 50. Said bimetallic element 56 is so disposed when my hereinabove described control device is used in a heating system that the heat of the main burner will cause the free end to move toward the lever 50.

Thus the relation of the elements 54 and 56 and the lever 50 is such that when the pilot 19 is lighted, the heated element 54 will move the upper end of the lever 50 away from the pilot thereby causing the lower end of lever 50 to draw the wire 29 away from the head 26 on the valve stem 24. When the said wire 29 has been drawn the desired distance, the valve stem extension 24' will be drawn by the spring 25 away from the collar 13 on stem 11, releasing the latter and permitting the valve 2 to be opened for the supply of gas to such main burner. The heat from said main burner causes the metal element 56 to expand and its top will move toward the lever 50 and check the movement thereof under influence of the element 54. Therefore, by proper adjustments lever 50 will remain stationary when elements 54 and 56 are subjected to the heat of the pilot light and the main burner due to the compensating action of the two elements which under expansion move toward each other. If the pilot burner is extinguished, element 54 will lose heat and the end will move toward the pilot light closing the valve 23 and separating the contact switch blades 34. If the said switch blades are connected in series in a circuit controlling the valve in a regulator such breakage of contact will cause the valve to move to closed position shutting off the flow of gas to the main burner. Obviously should both the main burner and pilot be extinguished, the elements 54 and 56 on cooling, will draw away from each other but in so moving element 54 will move with it the upper end of lever 50 thereby closing the valve 23 and opening the switch 34 as stated. By such an arrangement, the movement of lever 50 is restricted as desired without holding it against a fixed stop which would eventually cause a permanent set in the element 54. It will readily appear that movement of the lever 50 must be restricted by a fixed stop or otherwise if a quick response is to be secured when the pilot flame is extinguished.

In Fig. 3 the relation between my present invention and the several parts of a fuel control system for gas furnaces and the like, is shown diagrammatically. Connected in series in an electric circuit indicated generally at A is a solenoid 70, or other device responsive to an electric current, which operates in the usual manner when a current is passing therethrough to open the valve 70a controlling a pressure regulator 70b in the gas supply line such as is disclosed in the specification of my co-pending application No. 101,497, filed September 18, 1936. Current will flow in the circuit A only when the temperature, where a thermostat 71 is mounted, is such that its switch closes. Moreover, current cannot flow in the circuit A unless the switch 34 is closed, and said switch 34 is held open by the igniting device herein described unless the pilot is burning as hereinabove explained. In a second circuit generally indicated at 17 the igniting element 18 is in series with a switch 14 which switch is closed as the plunger in the lighting device is depressed. As explained, said plunger may be depressed only when the main valve is closed and is locked when in depressed position holding said main valve against opening until the pilot light is ignited and has burned for such time as to heat the bimetal element.

It will readily appear that the operation of my described safety ignition device when used in a control system is as follows: The burners and pilot of a gas furnace being unlighted the switch 34 will be open (and possibly the switch of the thermostat 71 if the room where it is located is sufficiently warm) and since no current is flowing to the solenoid 70, the valve in the pressure regulator will be closed. First the main valve 2 of the supply line must be shut. Then the plunger 7 may be depressed and will be held in a position closing the switch 14 and current will heat the igniting element 18 to incandescence. Gas supplied by the pipe 20, and passed to the line 21 through the valve opening 22, the valve 23 being locked in unseated position by the plunger 7 in depressed position will be ignited. The burning gas at the pilot will heat the bi-metallic element 27 causing it to bend toward a straight position, and release the shifting wire 29 permitting spring 25 to open valve 23 to its full extent. This will close the switch 34 and release the plunger 7. The main valve 2 may now be opened. If the switch controlled by the thermostat 71 is closed, current will flow through the circuit A and the solenoid 70 will open the valve in the pressure regulator. If the switch in the thermostat 71 is open, it will close as the room cools and the current will then flow to the solenoid 70. The pilot 19 will then light gas escaping from the furnace burners after main line valve 2 and the pressure regulator valve 70b have been opened, as explained.

Should the pilot light be extinguished, the bi-metal element 27 will contact and open switch 34 by shifting the wire 19. The flow of current to the solenoid 70 will be stopped and the valve in the pressure regulator will close. Also when the wire 19 is shifted by the contracting force of the bimetal element 27, it will close the valve 23 in the supply line to the pilot light.

The invention of the present application is shown in Figs. 1, 2, 4, 5 and 6, which invention is shown in Fig. 3 in a possible relation with other elements of a heating system and described in its relation therewith that the uses and functions of my present invention may be more readily understood.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. Apparatus for controlled lighting of a gas furnace burner, or the like, comprising, in combination, means operative to manipulate a valve controlling the flow of gas through a pipe line supplying such burner; a pilot light adapted to be placed adjacent such burner and having a gas supply independent thereof; a pilot valve, controlling gas supply means to said pilot light; means electrically operative to ignite gas from said pilot light; a switch normally held open, a device, inoperative when said pilot light is burning, and, operative, when said pilot light is not burning, to urge said pilot valve to a closed position; a starter plunger operative to move said pilot control valve to a partially open position; means operative to urge said plunger to an inoperative position; means associated with said pilot control valve operative to lock said plunger in operative position when said valve has been moved to partially open position; means resiliently urging said pilot valve to a fully open position and unlocking said plunger; means associated with said plunger operative when said plunger is in operative position to hold said switch closed; and means operative to render said plunger inoperative when said first named means has opened the valve in the supply line to such burner, which means, when said plunger is in operative position, lock said first-named means in inoperative position.

2. Apparatus for controlling the lighting of a gas furnace burner or the like, comprising means controlling a valve in the pipe supplying gas to such burner; a pilot light including means supplying gas thereto which means include an automatic valve normally urged to an open position; means electrically operative to ignite said pilot light; a switch normally held open; means operative to urge said automatic valve to a closed position, said means including a bi-metallic element exposed to the heat of said pilot light which element is so positioned that when cold it applies force closing said valve and when hot releases same; a starter plunger including a shaft operative when said plunger is in operative position to force said switch to a closed position, and a member mounted on said shaft operative when said plunger is operated to contact a stem of said automatic valve and force said valve open against the pressure of said bi-metallic element, and operative to engage said stem whereby said plunger is held in operative position until said valve is relieved of the pressure of said bi-metallic element; and means operative, when the valve supplying gas to the furnace burner is open, to lock said starter plunger in an inoperative position, and operative when such valve is closed and said starter plunger is in operative position to lock such valve in closed position.

3. Apparatus for controlling the lighting of a gas furnace burner or the like, comprising a pilot light adapted to be placed adjacent such burner; a gas supply passage to said pilot light; an electric igniter adjacent said pilot light; a switch normally open; a valve and valve seat in said gas supply passage, said valve having a stem extending through said valve seat and a stem oppositely extended; a spring so mounted on said last-named stem as to urge said valve to an open position; a rod mounted for reciprocation with an end pressed against the end of said last-named valve stem; a bi-metal element so mounted that through said rod it urges said valve to a closed position, said element being exposed to the heat of said pilot light and so positioned that as heat expands the metals of said element said rod is released; a starter plunger mounted for reciprocation and carrying a stem operative, on operation of the plunger, to close said switch, and carrying a cuneiform collar on said stem operative, on operation of the plunger, to engage the first-named valve stem and force said valve to an open position against the pressure of said bi-metal element urging said valve to a closed position, said collar being operative, as it moves past said valve stem, to engage same and lock said plunger in an operative position; a member, fixedly mounted on the stem of a valve controlling gas supply to such burner, and operative to lock said starter plunger in an inoperative position when such valve is open, and to lock such valve in a closed position when said starter plunger is in operative position.

4. Apparatus for controlled lighting of a gas furnace burner, or the like, comprising, in combination, means operative to manipulate a valve controlling the flow of gas through a pipe line supplying such burner; a pilot light adapted to be placed adjacent such burner and having a gas supply independent thereof; a valve, controlling gas supply means to said pilot light; means electrically operative to ignite gas from said pilot light; a switch normally held open, a device, inoperative when said pilot light is burning, and, operative, when said pilot light is not burning, to urge said pilot valve to a closed position; a starter plunger operative to move said pilot control valve to a partially open position; means associated with said pilot control valve operative to lock said plunger in operative position when said valve has been moved to partially open position; means resiliently urging said valve to a fully open position and unlocking said plunger; means associated with said plunger operative when said plunger is in operative position to hold said switch closed; and means operative to render said plunger inoperative when said first-named means has opened the valve in the supply to such burner; which means, when said plunger is in operative position, lock said first-named means in inoperative position.

5. Apparatus as described for controlling ignition of a gas burner, comprising, in combination, a pilot light, adapted to be mounted adjacent such a burner; means adapted to supply gas to said pilot light, said means including a passage, a valve controlling said passage, and spring means urging said valve to an open position; means electrically operative to ignite said pilot light; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, whereby said element when cold exerts a pressure through said rod closing said valve against the spring means which urge it open, and when heated releases said rod from such pressure thereby releasing said valve; a switch normally held in open position, a stem mounted on the input side of said valve in operative relation therewith; a starter plunger, resiliently urged to an inoperative position, mounted transversely of the free end of said stem, said plunger being operative to contact and close said switch when moved to an operative position; a member mounted on said plunger, which member is provided with an inclined face so positioned that on operative movement of the plunger said face contacts the end of said stem and forces said valve open against the pressure of said bi-metal element, and said member being operative, after said valve is forced open, to catch below the end of said stem, whereby said valve is locked in open position; and structure operative to support said elements in the stated relations.

6. Apparatus as described for controlling ignition of a gas burner, comprising, in combination, a pilot light, adapted to be mounted adjacent such a burner; means adapted to supply gas to said pilot light, said means including a passage, a valve controlling said passage, and spring means urging said valve to an open position; means electrically operative to ignite said pilot light; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, whereby said element when cold exerts a pressure through said rod closing said valve against the spring means which urge it open, and when heated releases said rod from such pressure thereby releasing said valve; a switch normally held in open position, a stem mounted on the input side of said valve in operative relation therewith; a starter plunger, resiliently urged to an inoperative position, mounted transversely of the free end of said stem, said plunger being operative to contact and close said switch when moved to an operative position; a member mounted on said plunger, which member is provided with an inclined face so positioned that on operative movement of the plunger said face contacts the end of said stem and forces said valve open against the pressure of said bi-metal element, and said member being operative, after said valve is forced open, to catch below the end of said stem, whereby said valve is locked in open position; a switch, normally held in open position, a connection between said last-named switch and said valve, operative to close said switch as said valve moves to fully open position; and structure operative to support said elements in the stated relations.

7. Apparatus as described for controlling ignition of a gas burner, comprising, in combination, a pilot light, adapted to be mounted adjacent such a burner; means adapted to supply gas to said pilot light, said means including a passage, a valve controlling said passage, and spring means urging said valve to an open position; means electrically operative to ignite said pilot light; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, which element when cold exerts a pressure through said rod closing said valve against the spring means which urge it open, and when heated releases said rod from such pressure thereby releasing said valve; a switch normally held in open position; a stem mounted on the input side of said valve in operative relation therewith; a starter plunger, resiliently urged to an inoperative position, mounted transversely of the free end of said stem, said plunger being operative to contact and close said switch when moved to an operative position; a member mounted on said plunger, which member is provided with an inclined face so positioned that on operative movement of the plunger said face contacts the end of said stem and forces said valve open against the pressure of said bi-metal element, and said member being operative, after said valve is forced open, to catch below the end of said stem, whereby said valve is locked in open position; a head mounted on said starter plunger, said head having a restricted neck connecting it therewith; a rotary valve in a pipe line supplying gas to a burner adjacent said pilot light; a plate member mounted normally on the stem of said rotary valve, said plate member having an aperture larger than said head and a circumferentially disposed slot extending from said aperture which slot is narrower than said head and wider than said neck, said plate member being so disposed relative to said plunger head that said head and said aperture are concentric when said rotary valve is in closed position; and structure operative to support said elements in the stated relations.

8. Apparatus as described for controlling ignition of a gas burner, comprising, in combination, a pilot light, adapted to be mounted adjacent such a burner; means adapted to supply gas to said pilot light, said means including a passage, a valve controlling said passage, and spring means urging said valve to an open position; means electrically operative to ignite said pilot light; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, which element when cold exerts a pressure through said rod closing said valve against the spring means which urge it open, and when heated releases said rod from such pressure thereby releasing said valve; a switch normally held in open position; a stem mounted on the input side of said valve in operative relation therewith; a starter plunger resiliently urged to an inoperative position, mounted transversely of the free end of said stem, said plunger being operative to contact and close said switch when moved to an operative position; a member mounted on said plunger, which member is provided with an inclined face so positioned that on operative movement of the plunger said face contacts the end of said stem and forces said valve open against the pressure of said bi-metal element, and said member being operative, after said valve is forced open, to catch below the end of said stem, whereby said valve is locked in open position; a switch, normally held in open position; a connection between said last-named switch and said valve, operative to close said switch as said valve moves to fully open position; a head mounted on said starter plunger, said head having a restricted neck connecting it therewith; a rotary valve in a pipe line supplying gas to a burner adjacent said pilot light; a plate member normally mounted on the stem of said rotary valve, said plate member having an aperture larger than said head and a circumferentially disposed slot extending from said aperture which slot is narrower than said head and wider than said neck, said plate member being so disposed relative to said plunger head that said head and said aperture are concentric when said rotary valve is in closed position; and structure operative to support said elements in the stated relations.

9. Apparatus operative to control the flow of gas to a main burner and to a gas pilot associated therewith, comprising in combination, a valve in a passage supplying gas to such burner; means operative to open and close said valve; a pilot valve in a second passage supplying gas to such pilot; a spring urging said pilot valve to an open position; closing means operative to close said pilot valve against the force of said spring, which closing means are rendered inoperative by the heat of gas burning in such pilot; an element operative to move such pilot valve to an open position, against the force of said closing means; and means adapted to actuate said element and lock same in operative position, said actuating means being so interlocked with said means operative to control said burner supply valve that said element operative to move said pilot valve to an open position can be actuated only when said burner supply valve is closed and that said element having been actuated said burner supply valve cannot be opened until the heat of gas burning in the pilot has released and rendered inoperative said closing means operative to close said pilot valve.

10. Apparatus operative to control the flow of gas to a main burner and to a gas pilot associated therewith, comprising in combination, a valve in a passage supplying gas to such burner; means operative to open and close said valve; a pilot valve in a passage supplying gas to such pilot; means urging said pilot valve toward an open position; closing means operative to hold said pilot valve in a closed position against the urge of said means urging to an open position, said closing means being rendered inoperative when subjected to the flame of the pilot light; opening means operative to force said pilot valve to partially open position against the closing force of said closing means and to latch in such operative position; and an interlocking device so connecting said means operative to open and close said burner supply valve with said means operative to force said pilot valve to partially open position, that said pilot valve means is held inoperative unless said burner valve means is in position closing said burner supply valve and that said burner control means is locked in position closing said burner supply valve when said pilot valve means is in position operative to partially open said pilot valve.

11. Apparatus operative to control the flow of gas to a main burner and to a gas pilot associated therewith, comprising in combination, a valve resiliently urged to fully open position in a passage supplying gas to such pilot, said valve being normally held closed; means, responsive to the heat of gas burning in the pilot, operative to release said valve permitting it to assume a fully open position; a manually operated device independent of said last-named means operative to open said valve to partially open position, said device being latched when in operative position and being released when said valve is further moved toward fully open position; a manually operated valve in a passage supplying gas to such main burner; interlocking means operative to prevent opening of said manually operated valve when said manually operated device is in position opening said pilot valve and adapted to prevent operation of said manually operated device except when said manually operated valve is in closed position.

12. Apparatus for controlling the lighting of a gas furnace burner or the like, comprising a pilot light adapted to be placed adjacent such burner; a gas supply passage to said pilot light; an electric igniter adjacent said pilot light; a valve and valve seat in said gas supply passage, said valve having a stem extending through said valve seat and a stem oppositely extended; a spring so mounted on said last-named stem as to urge said valve to an open position; a rod mounted for reciprocation with an end pressed against the end of said last-named valve stem; a bi-metal element so mounted that through said rod it urges said valve to a closed position, said element being exposed to the heat of said pilot light and so positioned that as heat expands the metals of said element, said rod is released; a starter plunger mounted for reciprocation and carrying a cuneiform collar operative on operation of the plunger to engage the first-named valve stem and force said valve to an open position against the pressure of said bi-metal element, urging said valve to a closed position, said collar being operative, as it moves past said valve stem, to engage and lock said plunger in an operative position; a member, fixedly mounted on the stem of a valve controlling gas supply to such burner, and operative to lock said starter plunger in an inoperative position when such valve is open, and to lock such valve in a closed position when said starter plunger is in operative position.

13. Apparatus as described for controlling ignition of a gas burner, comprising, in combination, a pilot light, adapted to be mounted adjacent such burner; means adapted to supply gas to said pilot light, said means including a passage, a valve controlling said passage and spring means urging said valve to an open position; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, whereby said element, when cold, exerts a pressure through said rod closing said valve against the spring means which urge it open, and when heated, releases said rod from such pressure, thereby releasing said valve; a stem mounted on the input side of said valve in operative relation therewith; a starter plunger, resiliently urged to an inoperative position mounted transversely of the free end of said stem; a member mounted on said plunger, which member is provided with an inclined face so positioned that on operative movement of the plunger said face contacts the end of said stem and forces said valve open against the pressure of said bi-metal element; and said member being operative, after said valve is forced open, to catch below the end of said stem, whereby said valve is locked in open position; and structure operative to support said elements in the stated relations.

14. Apparatus as described for controlling ignition of a gas burner, comprising, in combination, a pilot light, adapted to be mounted adjacent such burner; means adapted to supply gas to said pilot light, said means including a passage, a valve controlling said passage, and spring means urging said valve to an open position; a rod mounted with one end adjacent said pilot light and the other end in operative relation with said valve, said rod being longitudinally shiftable; a bi-metal element so mounted as to be subject to the heat of said pilot light and in operative engagement with the adjacent end of said rod, which element, when cold, exerts a pressure through said rod closing said valve against the spring means which urge it open, and when heated releases the said rod from such pressure, thereby releasing said valve; a stem mounted on the input side of said valve in operative relation therewith; a starter plunger, resiliently urged to an inoperative position, mounted transversely of the free end of said stem; a member mounted on said plunger, which member is provided with an inclined face so positioned that on operative movement of the plunger said face contacts the end of said stem and forces said valve open against the pressure of said bi-metal element, and said member being operative, after said valve is forced open, to catch below the end of said stem, whereby said valve is locked in open position and structure operative to support said elements in the stated relations.

OTTO FOX.